United States Patent [19]
Dierke

[11] Patent Number: 5,850,572
[45] Date of Patent: Dec. 15, 1998

[54] ERROR-TOLERANT VIDEO DISPLAY SUBSYSTEM

[75] Inventor: Gregg Dierke, San Jose, Calif.

[73] Assignee: LSI Logic Corporation, Milpitas, Calif.

[21] Appl. No.: 613,061

[22] Filed: Mar. 8, 1996

[51] Int. Cl.$^6$ ...................................................... G09G 5/00
[52] U.S. Cl. ........................ 395/873; 395/436; 395/437; 395/849; 395/877; 395/513
[58] Field of Search ..................... 395/427, 428, 395/436, 437, 511, 513, 515, 516, 849, 872, 873, 877; 370/229, 230

[56] References Cited

U.S. PATENT DOCUMENTS

| | | | |
|---|---|---|---|
| 4,748,588 | 5/1988 | Norman et al. | 395/551 |
| 5,384,890 | 1/1995 | Anderson et al. | 395/2.09 |
| 5,426,756 | 6/1995 | Shyo et al. | 395/486 |
| 5,450,544 | 9/1995 | Dixon et al. | 395/507 |
| 5,453,790 | 9/1995 | Vermeulen et al. | 348/410 |

OTHER PUBLICATIONS

Haskell, B. et al., "Variable Bit–Rate Video Coding for ATM and Broadcast Applications", ICASSP'93: Acoustics Speech & Signal Processing Conference, pI 114(2).

Hui, J. e tal., "Client–Server Synchronization and Buffering for Variable Rate Multimedia Retrievals", IEEE Journal on Selected Areas in Communications, v 14, n1, Jan. 1996, p. 226(110.

Sathaye, S. et al., "FIFO Design for a High–Speed Network Interface", Local Computer Networks, 1994 19th Conference, p2(9).

Uematsu, H. et al., "STM Signal Transfer Techniques in ATM Networks", Supercomm/ICC '92: Discovering a New World of Communications, p. 311.6.19(4).

Varelas, T. et al., "More than ASICs Needed to Compose Sonet", Electronic Engineering Times, OCt.2, 1995, n868 p. 46(2).

*Primary Examiner*—Raymond J. Bayerl
*Assistant Examiner*—U. Chauhan
*Attorney, Agent, or Firm*—Oppenheimer Poms Smith

[57] ABSTRACT

A Video Display FIFO includes a circular buffer and counters that allow the FIFO to properly recover from data alignment problems caused by FIFO underflow. A pair of counters store read and write pointers, which indicate the addresses of data read from and written into the buffer. Another counter stores a count of data in the buffer. Buffer underflow causes the count to go negative and the read pointer to advance ahead of the write pointer. Data written into the buffer while the total count is negative is not read out of the buffer. This allows alignment of the data to be restored.

26 Claims, 2 Drawing Sheets

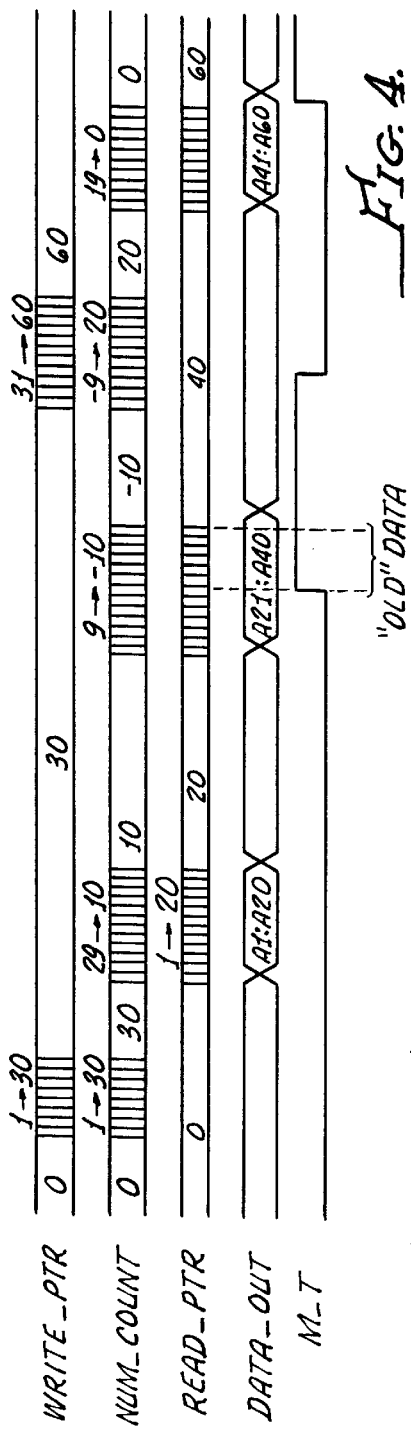
FIG. 4.
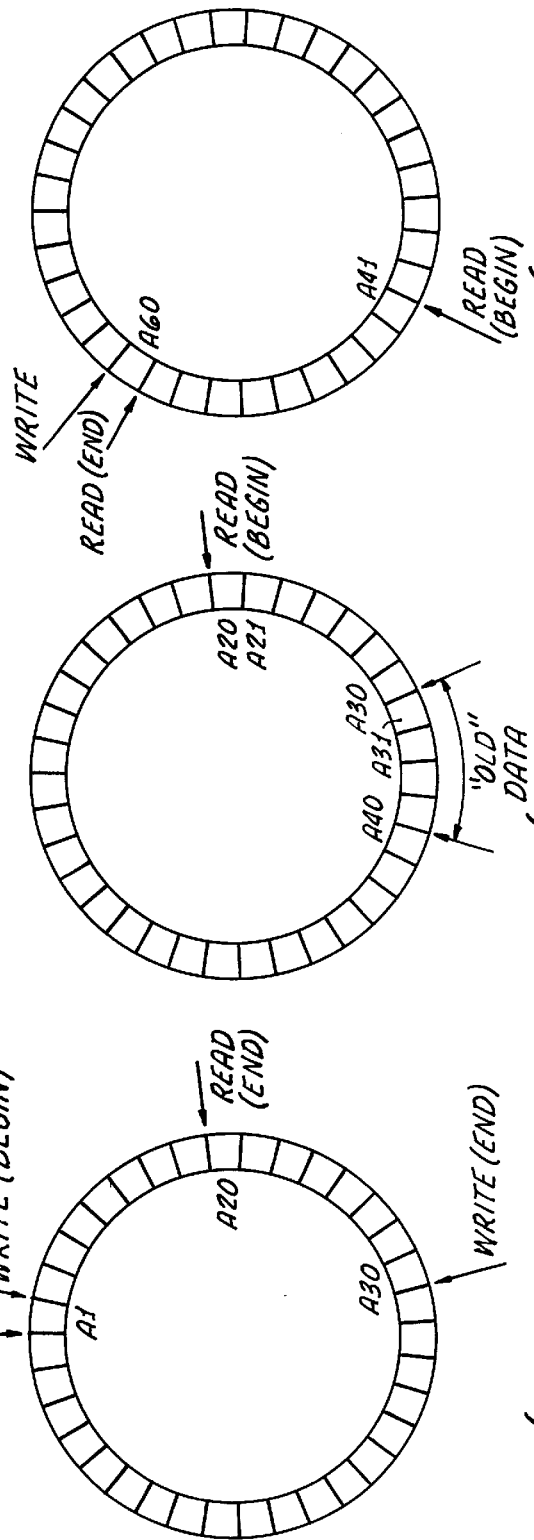
FIG. 5a.
FIG. 5b.
FIG. 5c.

ERROR-TOLERANT VIDEO DISPLAY SUBSYSTEM

BACKGROUND OF THE INVENTION

The invention relates to video display systems. The invention also relates to digital communications.

Data encoding is very important to the television industry, especially with the emergence of direct broadcast television systems. In a direct broadcast system, digital signals carrying near-perfect video images and audio waveforms are encoded according to the MPEG specification, transmitted to a satellite orbiting the earth, and relayed by the satellite on the Ku band to any home equipped with a small dish antenna and a receiver unit. Encoding is required to fit the massive amount of digital words describing the video images and audio waveforms within the Ku band. The encoded signals received by the dish antenna are decoded by the receiver unit and displayed on a television. At the heart of every receiver unit is an MPEG video decoder.

All current MPEG video decoders utilize the same memory system to reconstruct, store, copy, and display the video images. The memory system must handle up to three images simultaneously. The memory system must also buffer channel data for video and audio, and store On-Screen Display (OSD) bitmaps. That's an awful lot of tasks for a single memory system to perform. It is only through very sophisticated control that the video and audio is decoded, reconstructed, and displayed without interruption. However, 90–95% of available memory bandwidth is used.

In order to use precious memory bandwidth as efficiently as possible, the memory system includes small on-chip FIFO (First-In, First-Out) buffers for the various processing modules in the video decoder. Some FIFOs are filled up slowly and then write their data to external memory in a quick burst. Others receive bursty inputs from memory, and are then emptied at a slower, more constant rate. Among these FIFOs is a Video Display FIFO, which receives bursty inputs of data from a video retrieval module and outputs data at a constant and continuous rate to a video display device.

It is possible that errors may occasionally occur at the Video Display FIFO. In one instance, the data supplied to the Video Display FIFO is erroneous. Perhaps the data is accessed from a wrong address in the video retrieval module or the data from the video retrieval module is corrupted due to system noise. These types of errors are difficult to detect, so the erroneous data is displayed by the video display. Fortunately, this type of error almost never occurs in a properly designed system. Thus, there is no practical need to worry about it.

In another instance, the video retrieval module fills up the Video Display FIFO faster than it can be emptied. As a result, the Video Display FIFO overflows, good data is lost, and incomplete images are displayed. Fortunately, overflow of the Video Display FIFO can be detected early and prevented before data is lost. Practically speaking, overflow isn't an issue either.

In yet another instance, the Video Display FIFO becomes starved for data because the video retrieval module does not retrieve or generate data fast enough to supply the demand from the display device. Underflow occurs. This is a more realistic problem, and can occur quite early due to other systems and dataflow problems. Underflow can happen quite easily. If the underflow is not corrected, erroneous data is displayed during the underflow. Moreover, the insertion of erroneous data causes the image to shift. The Video Display FIFO has no "knowledge" of what data should appear on the display device and where that data should appear. Position of the data on the display device is determined solely by the time at which the data is read out from the Video Display FIFO. Since the timing is affected by the erroneous data read out during underflow, this "extra" data shifts the remainder of the image to the right. Compare the "good" image in FIG. 1a to the shifted image in FIG. 1b.

SUMMARY OF THE INVENTION

The problems caused by underflow of the Video Display FIFO are overcome by a method of writing and reading elements into and out of a buffer in accordance with the present invention. According to one broad aspect of the invention, the method comprises the steps of keeping track of a number of erroneous reads; and not reading a corresponding number of elements written into the buffer following the erroneous reads.

According to another aspect of the present invention, a video display FIFO comprises a buffer; means for keeping track of a number of erroneous reads from the buffer due to underflow; and means for reading from the buffer. A corresponding number of elements written into the buffer following the erroneous reads are not read out of the buffer by the reading means.

According to yet another aspect of the present invention, a digital video system comprises a video module; a display device; and a Video Display FIFO. The Video Display FIFO includes a buffer; a write pointer for indicating the addresses at which elements are written into the buffer from the video module; and a read pointer for indicating the addresses from which the elements are read out of the buffer to the display device. Unlike a conventional FIFO, the read pointer is allowed to advance past the write pointer when an erroneous read occurs.

The elements written into the buffer behind the read pointer are not read out of the buffer.

BRIEF DESCRIPTION OF THE DRAWINGS

FIG. 4 is a timing diagram of read and write operations performed by the Video Display FIFO shown in FIG. 3; and FIGS. 5a, 5b and 5c illustrate the read and write operations in the Video Display FIFO according to the timing diagram shown in FIG. 4.

DETAILED DESCRIPTION OF THE PREFERRED EMBODIMENTS

Figure 2:
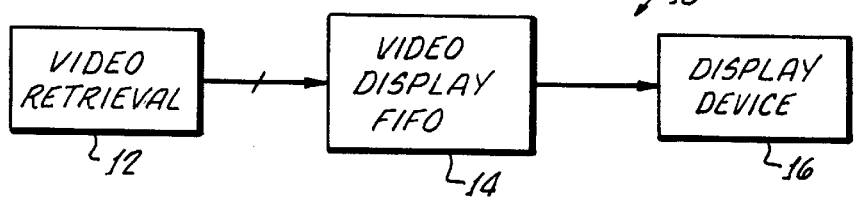
FIG. 2 is a block diagram of the digital video system according to the present invention.

FIG. 2 shows a digital video system 10 according to the present invention. A video retrieval module 12 retrieves and/or generates bursts of data representing frames of video images. The video retrieval module 12 can be an MPEG video decoder. A Video Display FIFO 14 receives the bursts of data from the video retrieval module 12, buffers the data and outputs the data at a constant and continuous rate. The data is read out to a display device 16 such as a video digital-to-analog converter (DAC) or an NTSC converter. The output rate of the Video Display FIFO 14 can be controlled internally (in which data is read out every n cycles) or externally (the data is read out upon request from another chip, such as the video DAC or NTSC converter). The Video Display FIFO 14 can be located on-chip with the video retrieval module 12 or it can be provided as an external memory device.

Figure 3:
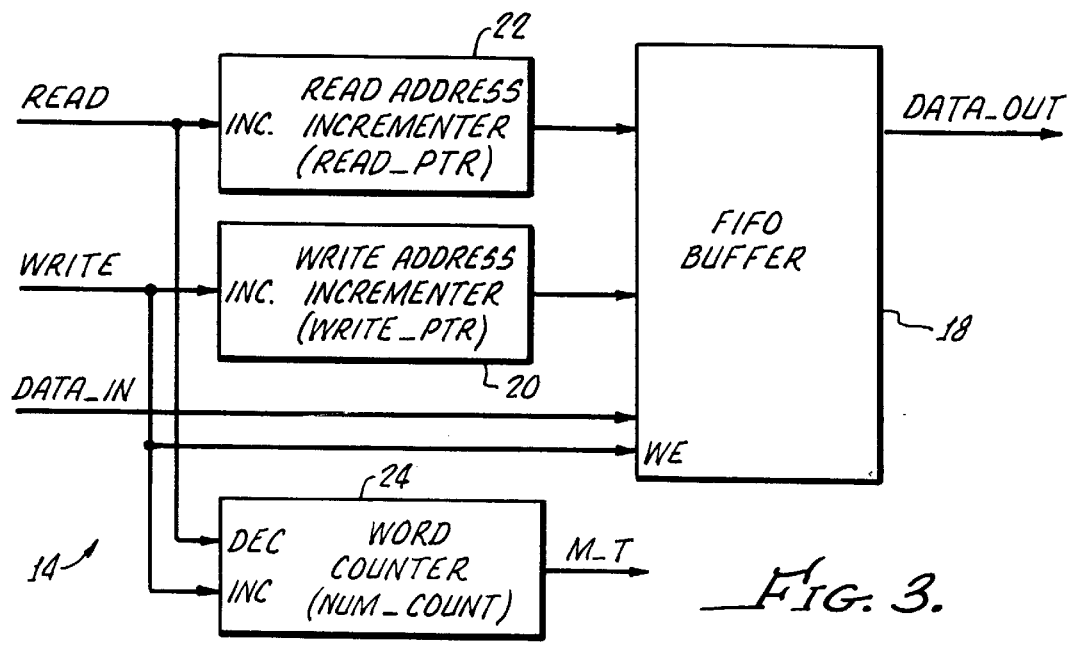
FIG. 3 is a block diagram of the Video Display FIFO, which forms a part of the digital video system shown in FIG. 2.

FIG. 3 shows the Video Display FIFO 14 in greater detail.

The Video Display FIFO 14 includes a circular buffer 18 for storing data from the video retrieval module 12. Data is written into the circular buffer 18 by supplying pulses on a WRITE line and by supplying data on a DATA_IN line to the circular buffer 18. The pulses are received by a write-address incrementer 20, which increments its count (the count is hereinafter referred to as write pointer WRITE_PTR), and a write-enable (WE) of the circular buffer 18. The circular buffer 18 stores the data placed on the DATA_IN line at the address(es) indicated by the write pointer WRITE_PTR. The pulses on the WRITE line are supplied by the video retrieval module 12. The write-address incrementer 20 is a modulo counter having a modulus equal to the size of the circular buffer 18. That is, the write-address incrementer 20 increments the write pointer WRITE_PTR from zero to a number n−1 (where n indicates the size of the circular buffer 18) and back to zero.

New data is read out of the circular buffer 18 in response to a pulse on a READ line. The pulse on the READ line can be provided by either an internal source on the chip (in which case data is pushed out of the circular buffer 18) or from an external source (in which case data is pulled out of the circular buffer 18). The pulse on the READ line causes a read-address incrementer 22 to increment its count (the count is hereinafter referred to as read pointer READ_PTR), and the circular buffer 18 to read out the data at the address(es) indicated by the read pointer READ_PTR. The read-address incrementer 22 is also a modulo counter having a modulus equal to the size of the circular buffer 18.

A word counter 24 keeps a total count NUM_COUNT of the number of words written into the circular buffer 18. The wordcounter 24 increments the total count NUM_COUNT in response to a pulse on the WRITE line and decrements the total count in response to a pulse on the READ line. The total count NUM_COUNT ranges between positive and negative values.

The circular buffer 18 can be a dual-port RAM. The incrementers 20 and 22 and counter 24 can be realized by hardware counters. In the alternative, the incrementers 20 and 22, counter 24 and even the circular buffer 18 itself can be eliminated, and their functions can be performed under software control of the video retrieval module 12.

Under normal operation, bursts of data are written into the circular buffer 18. Data is read out of the circular buffer 18 at a constant rate and the read pointer READ_PTR never passes the write pointer WRITE_PTR. That is, the FIFO never underflows.

Image retrieval problems can interrupt the normal operation and cause the circular buffer 18 to eventually become empty (i.e., the total count NUM_COUNT equals zero, and the read pointer READ_PTR equals the write pointer WRITE_PTR). As the circular buffer 18 underflows, the read pointer READ_PTR temporarily passes the write pointer WRITE_PTR, the total count NUM_COUNT becomes negative, and erroneous data is read out of the circular buffer 18. Erroneous data reads continue until image retrieval is restored and data is written into the circular buffer 18 again. At that point, circular buffer 18 fills up, the total count NUM_COUNT increases to zero and then becomes positive, and the write pointer WRITE_PTR catches up to, and passes, the read pointer READ_PTR. Data written into the circular buffer 18 while the total count is negative is not read out of the circular buffer 18. Once the total count becomes positive, correct data is once again read out of the circular buffer 18.

An example of the operation of the Video Display FIFO 14 is illustrated in FIGS. 4, 5a, 5b and 5c. During a first set of normal write-read operations (see FIG. 5a), the write pointer WRITE_PTR stays ahead of, or even with, the read pointer READ_PTR. A burst of thirty pulses on the WRITE line is supplied to the write-address incrementer 20, circular buffer 18 and word counter 24, and data on the DATA_IN line is supplied to the circular buffer 18. For each pulse, data on the DATA_IN line is written into the circular buffer 18 at an address indicated by the write pointer WRITE_PTR. At the end of the first write operation, data is stored in thirty consecutive addresses A1:A30 of the circular buffer 18, the total count NUM_COUNT is thirty, and the write pointer WRITE_PTR is ahead of the read pointer READ_PTR by thirty. Then, twenty pulses on the READ line are supplied to the read-address incrementer 22 and word counter 24. The total count NUM_COUNT is decremented to ten, the read pointer READ_PTR is incremented to twenty, and the data at the first twenty addresses A1:A20 is read out from the circular buffer 18.

During a second set of read-write operations (see FIG. 5b), another twenty pulses on the READ line are supplied to the read-address incrementer 22 and word counter 24. The first ten of those pulses cause data at another ten addresses A21:A30 to be read out of the circular buffer 18, the total count NUM_COUNT to be decremented to zero, and the read pointer READ_PTR to pull even with the write pointer WRITE_PTR. The circular buffer 18 is now empty, and a buffer empty signal M_T is issued by the word counter 24. The next ten of those pulses on the READ line cause underflow to occur. The read pointer READ_PTR moves ahead of the write pointer WRITE_PTR, the total count NUM_COUNT becomes negative, and data at the next ten addresses A31:A40 is read out of the circular buffer 18. The data at those ten addresses A31:A40 (which was left over from previous reads to the circular buffer 18) can be supplied to the display device even though it is old. In the alternative, the old data can be blanked out by the empty signal M_T, or the old data can be replaced with "neutral" data (e.g. average values of adjacent pixels in the video image ) when the empty signal M_T goes high.

The second write operation causes the write pointer WRITE_PTR and total count NUM_COUNT to be incremented thirty more times. At the end of the second write operation, data is written into another thirty consecutive addresses A31:A60 of the circular buffer 18, the total count NUM_COUNT is increased from −10 to +20, and the write pointer WRITE_PTR is advanced ahead of the read pointer READ_PTR by twenty.

During a third read operation (see FIG. 5c), another twenty pulses on the READ line come in, and the correct data at the last twenty addresses A41:A60 is read out of the circular buffer 18. At the end of the third read operation, the word count NUM_COUNT is equal to zero, the read and write pointers READ_PTR and WRITE_PTR are even, and the circular buffer 18 is once again empty. The data written into the ten addresses A31:A40 of the circular buffer 18 was not read out of the circular buffer 18. This is because those ten addresses were behind the read pointer READ_PTR. The data written into the addresses A41:A60 was ahead of the read pointer READ_PTR and, therefore, was read out of the circular buffer 18.

Figure 1A:
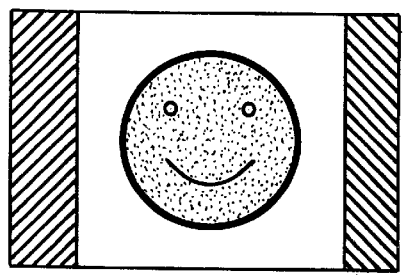
FIG. 1a is an illustration of a video image provided by a digital video system.
Figure 1B:
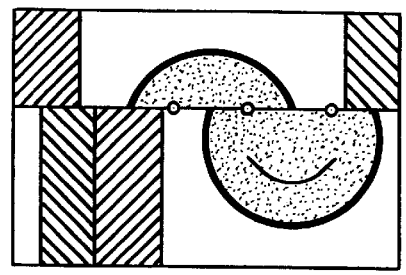
FIG. 1b is an illustration of the video image resulting from an underflow of a Video Display FIFO in a digital video system according to the prior art.
Figure 1C:
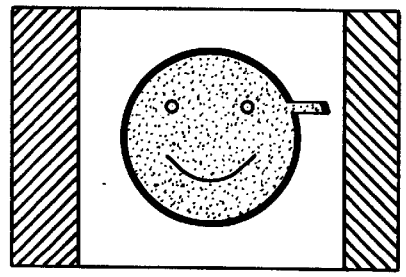
FIG. 1c is an illustration of the video image resulting from an underflow of a Video Display FIFO in a digital video system according to the present invention.

Thus disclosed is a video system that properly recovers from an underflow of its Video Display FIFO. Whereas a prior art video system would not properly recover and produce the video image shown in FIG. 1b, the video system according to the present invention produces the video image shown in FIG. 1c. Recovery is accomplished without an increase in memory usage. Increased memory usage is a penalty that commercial video systems such as MPEG decoders simply cannot afford, since so much of the available bandwidth (90–95%) is already used up.

It is understood that various changes and modifications may be made without departing from the spirit and scope of the invention. The size of the circular buffer and the range of the pointers WRITE_PTR and READ_PTR and total count NUM_COUNT can be selected to tolerate a desired number of underflow errors by increasing the counter size to count as many negative items as desired.

It is also understood that the invention is not limited to the operation shown in FIGS. 4, 5a, 5b and 5c. Nor is the invention limited to the recovery of underflow. It can be used to recover from any error that causes a shift in the display of a video image.

Finally, it is understood that the invention is not limited to MPEG video decoders, video DACs and NTSC converters. The video retrieval module can process data that is not encoded, or it can process data encoded according to a standard such as MPEG-1, MEG-2, Digicipher I and II, or JPEG. These standards are currently being used in a wide array of consumer products employing video encoding, such as direct broadcast television systems, cable TV and direct audio broadcast systems. The invention can be applied to video/audio MPEG decoders and graphics accelerator boards for personal computers. In fact, the invention can include any module that generates bursty outputs and any device that requires data at a constant and continuous rate, or the invention can include any module that receives data at a constant and continuous rate and outputs data in bursts. Accordingly, the present invention is not limited to the precise embodiment described hereinabove. Instead, it is defined by the claims that follow.

I claim:

1. A method of writing and reading elements into and out of a buffer, comprising the steps of
    keeping track of a number of erroneous reads; and
    not reading a corresponding number of elements written into the buffer following the erroneous reads.

2. The method of claim 1 wherein the erroneous reads are due to underflow of the buffer.

3. The method of claim 1, wherein the corresponding number of elements are provided to an input of the buffer and are written to valid addresses in the buffer, but are skipped during subsequent reads.

4. The method of claim 3, wherein a write pointer is used to indicate the addresses at which elements are written into the buffer, and wherein a read pointer is used to indicate the addresses at which elements are read out of the buffer.

5. The method of claim 4, wherein the write pointer is kept equal with or ahead of the read pointer when erroneous reads do not occur, and wherein the read pointer is advanced past the write pointer when erroneous reads occur.

6. The method of claim 5, wherein the buffer is a circular buffer having a predetermined size, and wherein each pointer has a modulus equal to the size of the circular buffer.

7. The method of claim 1, wherein track of the number of erroneous reads is kept by incrementing a count for each write into the circular buffer and decrementing the count for each read from the circular buffer, whereby the count has a negative value when the buffer underflows.

8. A method of writing to and reading from a Video Display FIFO, the method comprising the steps of:
    writing to the FIFO in response to a write pulse;
    incrementing a count in response to the write pulse;
    decrementing the count in response to the read pulse; and
    reading from the FIFO in response to a read pulse, except for data written to the buffer when the count is negative.

9. The method of claim 8, wherein a write pointer is used to indicate the addresses of writes to the FIFO, and wherein a read pointer is used to indicate the addresses of reads from the FIFO.

10. The method of claim 9, wherein the write pointer is kept equal with or ahead of the read pointer when the count is a positive number, and wherein the read pointer is advanced ahead of the write pointer when the count is a negative number.

11. The method of claim 10, wherein the FIFO includes a circular buffer having a predetermined size, and wherein each pointer has a modulus equal to the size of the circular buffer.

12. A video display FIFO, comprising:
    a buffer;
    means for keeping track of a number of erroneous reads from the buffer due to underflow; and
    means for reading from the buffer, the reading means not reading a corresponding number of elements written into the buffer following the erroneous reads.

13. The FIFO of claim 12, wherein the corresponding number of elements are provided to an input of the buffer and are written to valid addresses in the buffer, but are skipped during subsequent reads.

14. A Display FIFO, comprising:
    a buffer;
    a write pointer for indicating the addresses at which elements are written to the buffer; and
    a read pointer for indicating the addresses from which the elements are read out of the buffer;
    the read pointer being allowed to advance past the write pointer when erroneous reads due to buffer underflow occur;
    the elements written into the buffer behind the read pointer not being read out of the buffer.

15. The FIFO of claim 14, further comprising:
    a write-address incremented for incrementing the write pointer in response to a write pulse; and
    a read-address incrementer for incrementing the value of the read pointer in response to a read pulse.

16. The FIFO of claim 15, wherein the buffer has a predetermined size, and wherein the incrementers are modulo counters, each counter having a modulus equal to the size of the buffer.

17. The FIFO of claim 14, wherein the buffer is a circular buffer.

18. The FIFO of claim 14, further comprising a counter for keeping a count of the buffered elements, the counter incrementing the count when an element is written to the buffer and decrementing the count when an element is read from the buffer, whereby a negative count indicates the occurrence of buffer underflow.

19. A digital video system comprising:

a video retrieval module;

a display device; and a Video Display FIFO including a buffer; a write pointer for indicating the addresses at which elements are written into the buffer from the video retrieval module; and a read pointer for indicating the addresses from which the elements are read out of the buffer to the display device; the read pointer being allowed to advance past the write pointer when erroneous reads due to underflow of the buffer occur; the elements written into the buffer behind the read pointer not being read out of the buffer.

20. The system of claim 19, further comprising:

a write-address incrementer for incrementing the write pointer in response to a write pulse; and a read-address incrementer for incrementing the value of the read pointer in response to a read pulse.

21. The system of claim 20, wherein the buffer has a predetermined size, and wherein the incrementers are modulo counters, each counter having a modulus equal to the size of the buffer.

22. The system of claim 20, further comprising a counter for keeping a count of the buffered elements, the counter incrementing the count in response to the write pulse and decrementing the count in response to a read pulse.

23. The system of claim 19, wherein the buffer is a circular buffer.

24. The system of claim 19, wherein the display device is an NTSC converter.

25. The system of claim 19, wherein the display device is a video DAC.

26. The system of claim 19, wherein the video module is an MPEG video decoder, and wherein the Video Display FIFO is located on the same chip as a video display module of the MPEG video decoder.

* * * * *